United States Patent [19]

Kobayashi et al.

[11] Patent Number: 5,231,585
[45] Date of Patent: Jul. 27, 1993

[54] COMPUTER-INTEGRATED MANUFACTURING SYSTEM AND METHOD

[75] Inventors: Mamoru Kobayashi; Hideaki Sasaki, both of Hadano; Kazuo Kato, Yamato; Akio Kojima, Hadano; Sigeru Ninomiya, Tokyo; Yoshihisa Tsuji, Hadano, all of Japan

[73] Assignees: Hitachi Ltd., Tokyo; Hitachi Computer Engineering Co., Ltd., Hadano, both of Japan

[21] Appl. No.: 541,262

[22] Filed: Jun. 20, 1990

[30] Foreign Application Priority Data

Jun. 22, 1989 [JP] Japan ................. 1-160290

[51] Int. Cl.5 ........................... G06F 15/46
[52] U.S. Cl. .................. 364/468; 364/132; 364/478
[58] Field of Search ............ 364/468, 478, 474.11, 364/132, 131, 133–136; 198/346.1, 465.2, 601

[56] References Cited

U.S. PATENT DOCUMENTS

| | | | |
|---|---|---|---|
| 4,251,858 | 2/1981 | Cambigue et al. | 364/474.11 X |
| 4,472,783 | 9/1984 | Johnstone et al. | 364/468 X |
| 4,630,216 | 12/1986 | Tyler et al. | 364/468 X |
| 4,698,766 | 10/1987 | Entwistle et al. | 364/132 X |
| 4,827,423 | 5/1989 | Beasley et al. | 364/468 X |
| 4,901,242 | 2/1990 | Kotan | 364/468 |
| 4,930,086 | 5/1990 | Fukasawa | 364/468 |
| 4,974,166 | 11/1990 | Maney et al. | 364/468 X |

Primary Examiner—Joseph Ruggiero
Attorney, Agent, or Firm—Kenyon & Kenyon

[57] ABSTRACT

A production management system for managing production by using a plurality of working devices arranged in the production processes includes a host management device for managing control data necessary for producing a product, working device managing terminals provided in correspondence with working devices used for the production for processing information necessary in managing the working devices, and a terminal information management device for integrally managing information items which are processed at individual working device management terminals. Each working device management terminal is connected with the terminal information management device through a network to enable transfer of information between each working device terminal and the terminal information management device and between individual working device terminals. Further, working device terminals which require transfer of control data held by the terminal information management device and the host management device are connected to the host management device to enable exchanges of information between the connected devices.

12 Claims, 10 Drawing Sheets

FIG. 5

| WORK LOT NUMBER | SUBSTRATE PRODUCT NAME | SUBSTRATE BAR CODE |
|---|---|---|
| 1234 | AB001 | 00001001 |
| 1234 | AB001 | 00001003 |
| 1234 | AB002 | 00001005 |
| 1234 | AB003 | 00001006 |

FIG. 6

| WORK LOT NUMBER | SUBSTRATE PRODUCT NAME | BAR CODE FOR PARTS BEFORE PRE-PROCESSING |
|---|---|---|
| 1234 | AB001 | 2011 |
| 1234 | AB001 | 2035 |
| 1234 | AB002 | 2001 |
| 1234 | AB003 | 2053 |

FIG. 7

| WORK LOT NUMBER | SUBSTRATE PRODUCT NAME | BAR CODE FOR PARTS BEFORE PRE-PROCESSING | BAR CODE FOR PARTS AFTER PRE-PROCESSING |
|---|---|---|---|
| 1234 | AB001 | 2011 | 3032 |
| 1234 | AB001 | 2035 | 3021 |
| 1234 | AB002 | 2001 | 3051 |
| 1234 | AB003 | 2053 | 3021 |

FIG. 8

| PARTS WAREHOUSE SHELF NUMBER | BAR CODE FOR PARTS AFTER PRE-PROCESSING |
|---|---|
| 001 | 3981 |
| 002 | 3903 |
| 003 | 3032 |
| 004 | 3021 |
| 005 | 3051 |
| 006 | 3012 |
| 007 | EMPTY |
| 008 | EMPTY |

FIG. 9

| WORK LOT NUMBER | SUBSTRATE PRODUCT NAME | SUBSTRATE BAR CODE | BAR CODE FOR PARTS BEFORE PRE-PROCESSING | BAR CODE FOR PARTS AFTER PRE-PROCESSING | PARTS WAREHOUSE SHELF NUMBER |
|---|---|---|---|---|---|
| 1234 | AB001 | 00001001 | 2011 | 3032 | 0003 |
| 1234 | AB001 | 00001003 | 2035 | 3021 | 0004 |
| 1234 | AB002 | 00001005 | 2001 | 3051 | 0005 |
| 1234 | AB003 | 00001006 | 2053 | 3012 | 0006 |

FIG. 10

| WORK LOT NUMBER | SUBSTRATE PRODUCT NAME | SUBSTRATE BAR CODE |
|---|---|---|
| 1234 | AB001 | 00001001 |
| 1234 | AB001 | 00001003 |
| 1234 | AB002 | 00001005 |
| 1234 | AB003 | 00001006 |

FIG. 11

| SUBSTRATE BAR CODE | WORK LOT NUMBER | SUBSTRATE PRODUCT NAME |
|---|---|---|
| 00001001 | 1234 | AB001 |
| 00001003 | 1234 | AB001 |
| 00001005 | 1234 | AB002 |
| 00001006 | 1234 | AB003 |

FIG. 12

| SUBSTRATE BAR CODE | WORKING DAY | TIME | OPERATOR'S NAME | WORK CONDITION | REMARKS |
|---|---|---|---|---|---|
| 00001001 | 89.01.23 | 14:56 | ICHIRO TANAKA | XYZ123 | |
| 00001003 | 89.01.23 | 14:53 | ICHIRO TANAKA | XYZ120 | |
| 00001005 | 89.01.23 | 15:01 | SABURO SATO | ABC012 | |
| 00001006 | 89.01.23 | 15:12 | SABURO SATO | ABC012 | |

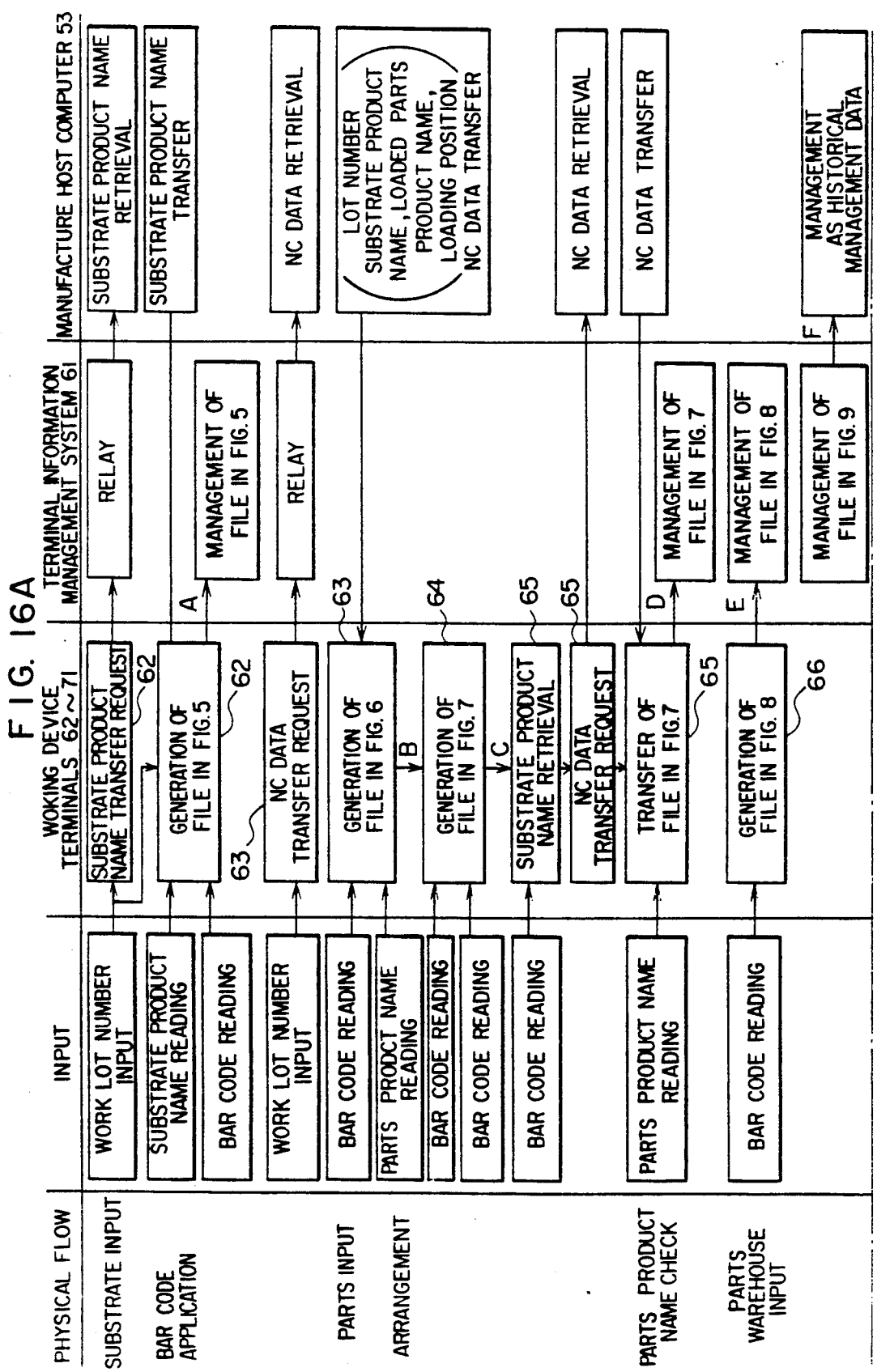

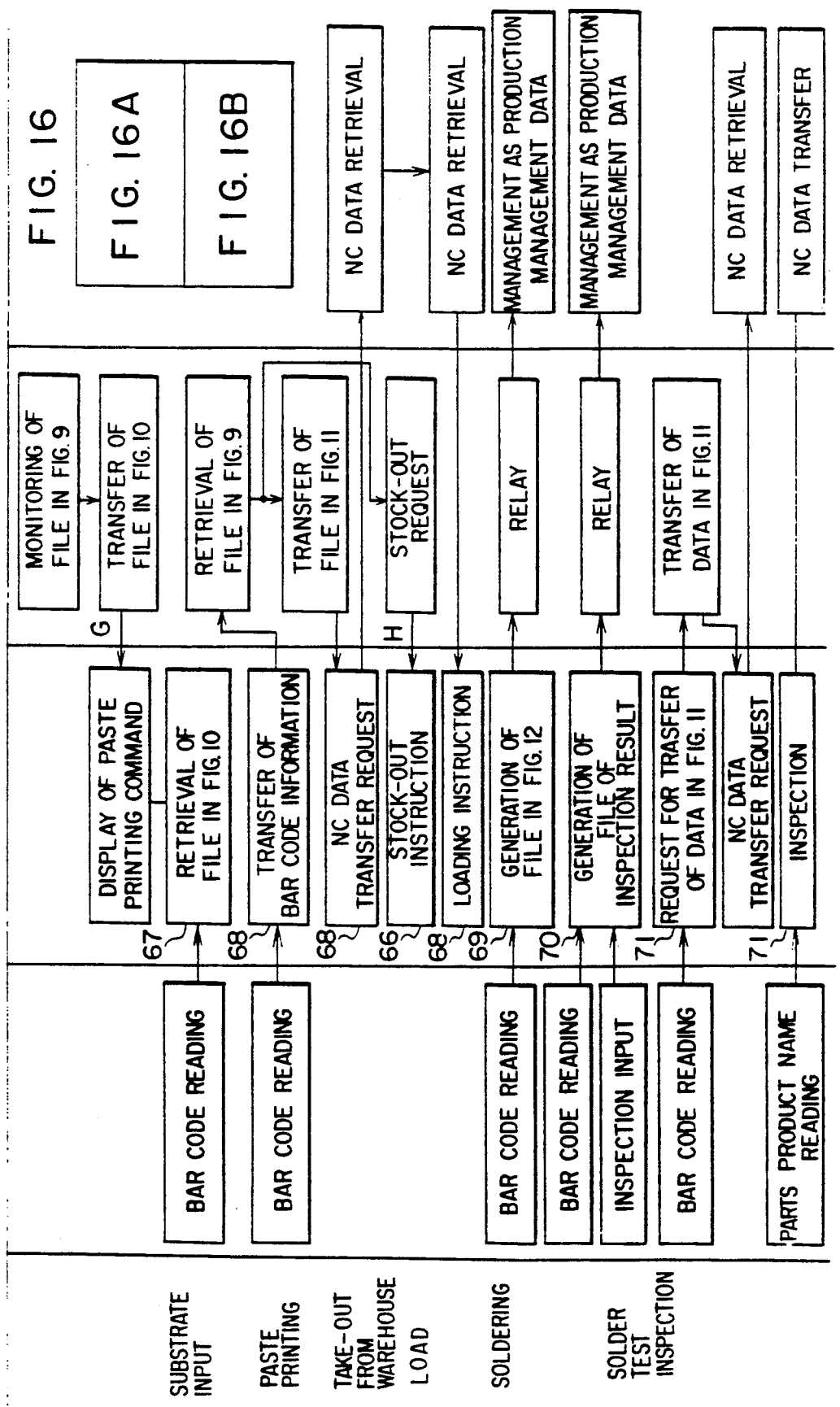

COMPUTER-INTEGRATED MANUFACTURING SYSTEM AND METHOD

BACKGROUND OF THE INVENTION

The present invention relates, in general, to a computer integrated manufacturing (CIM), and, more particularly, to a production management system and method which are suitable for process management in the production process for mounting parts on a substrate such as a printed substrate or a ceramic substrate.

There have so far been attempts of automation in individual manufacturing units which are arranged in the process of manufacturing products such as printed substrates or the like on which many kinds of parts are mounted by small quantities like a CPU, a memory, various kinds of interfaces, controllers, etc. for use in computers and various kinds of control apparatuses. These manufacturing units, however, are managed individually independent of each other and no special consideration has been given to the management of positioning of individual processes of manufacturing the products in the production schedule, tuning of one manufacturing process with other processes, tuning of the state of producing one product with that of other products which are to be placed in the same manufacturing process, etc., which have all been managed manually.

Under this situation, there has been proposed a system which integrally manages production processes for manufacturing many kinds of products in small quantities.

This system is applied to the processes of producing printed substrates, and has a management structure which is divided into high, medium and small orders of management. In this structure of the management system, the high system manages the overall functions of a plant such as an order-making management, a design management, a parts management, etc., the medium order system manages manufacturing lines including managements or receiving of data from a high order (upper), supply of data to a low order (lower), and a progress management, and the low order system receives manufacturing information from the low order system and controls various automation equipments installed in the production lines.

The above-described conventional management system has a hierarchical structure to thereby generally manage various automatic devices provided in the manufacturing processes from the high order in accordance with the production schedule. It is considered that, by such arrangement, it is intended that the production management as described above is systematized and automated.

The above-described conventional management system is featured in that the high order system and the low order system exchange information through the medium order system.

This conventional management system, however, is considered to have the following problems.

A first problem is that a heavy burden is applied to the medium order system because all the information exchanges are performed through the medium order system. For example, when there is a large quantity of data to be transmitted from the high order system to the low order system or when there are frequent accesses to the medium order system, the medium order system becomes busy, having a potential of causing a bottleneck in the access to the medium order system, which will make it difficult to manage the whole system in real time.

In other words, this kind of problem will occur very easily since usually a large quantity of data is included in the manufacturing information such as numerical control (NC) data which is required in each automatic equipment. Further, since all the low order systems are connected to the low order systems through the medium order systems, each low order system asks the medium order systems for data pertaining to other processes required whenever it becomes necessary, so that the frequency of making access to the medium order systems increases, having a high risk of inviting the above problem.

A second problem is that since all the low order systems are connected to the high order systems through the medium order systems, there may occur such a situation that the low order systems cannot obtain data required and accordingly the manufacturing must be interrupted, when a part of the equipments is in fault, particularly when the medium order systems are down. This becomes a serious problem because the occurrence of this situation affects the system as a whole.

SUMMARY OF THE INVENTION

It is an object of the present invention to provide a production management system which can efficiently manage information necessary for the production, as a whole, by avoiding concentration of loads on a part of process machine or devices, by taking into account a supply source of the information, the process machine or device which uses the information, quantity of data, and the frequency of use of the information.

It is another object of the present invention to provide a production management system which can provisionally continue production even if a part of working machines or devices in the system is down, to thereby improve reliability of the production.

In order to achieve the above objects, according to one of the features of the present invention, the production management system which manages a production to be performed by using working devices provided in the processes includes a host managing means for managing control data necessary for the production of a product, working device managing terminals that are provided in correspondence with the working devices used for the production to thereby manage information necessary for managing the corresponding working devices, and terminal information managing means for integrally managing information that is processed at said individual working device managing terminals, and said individual working device managing terminals and the terminal information managing means are connected together through a network so as to enable transfer of information between the individual working device managing terminals and the terminal information managing means and between the individual working device managing terminals, and that the working device managing terminals which require transfer of control data held by said terminal information managing means and said host managing means are respectively connected to the host managing means so as to enable exchanges of information between the connected means.

Such a production management system as described above is suitably applied to a production management system for managing fabrication of printed substrates that is carried out by using working devices disposed at each production process. In this case, the host managing means manages mounting information which is necessary for mounting parts on the printed substrates.

It is desirable that the working device managing terminals and the terminal information managing means include input units for inputting instructions and data from the outside, display means for displaying management information and a storage unit for storing data generated by the managing terminals and managing means by themselves or data transferred from the others.

According to one aspect of the present invention, a production management system is provided in which one kind or two or more kinds of substrates that are used in a lot of articles to be produced and parts to be mounted on these substrates are supplied to production processes, with individual identifiers attached to these substrates, and also identifiers attached to accommodation containers in which parts are accommodated in sets corresponding to the substrates on which these parts are mounted, thereafter these identifiers being read out to enable the articles to be confirmed on the basis of the information read out, to thereby manage the substrates and the parts in the production processes. The production management system, in this case, includes an NC data managing means which holds and manages NC control data including production lot numbers, names of substrates to be used in the production lots, names of parts to be mounted on the substrates and positions and/or orders of the parts that are to be mounted on the corresponding substrates, a first file preparation or generation means which receives product data of substrates to be used from said NC data managing means based on the lot numbers to be inputted from the outside and prepares or generates a correspondence table showing a relationship among the low numbers, names of the substrates to be used and substrate identifier data which is a result of reading the identifiers attached to the substrates, a second file generating means which receives product data of substrates to be used from said NC data managing means based on the lot numbers to be inputted from the outside and generates a correspondence table showing a relationship among the lot numbers, names of the substrate to be used and part identifier data that is, a result of reading the identifier attached to the containers in which sets of parts to be mounted on the substrates are accommodated, a third file generating means which generates a correspondence table showing a relationship between shelf number in a storehouse and identification data of the sets of the parts and/or the substrates in the case of storing them in the storehouse, and file generalizing means which integrally collects the generated correspondence tables to generate an integrated correspondence table file and retrieve data requested by a production process for the integrated correspondence table and transfer the data to the production process.

In the above-described aspect, bar codes may be preferably used as the identifiers, but other equivalent means may also be used instead of bar codes.

According to another feature of the present invention, a carrier system is provided which is suitable for a post process of the process of fabricating printed substrates.

In accordance with another aspect of the present invention, an article carrier system is provided which sequentially carries articles in production to individual processing processes of a production process having a plurality of processing processes. In this article carrier system, when there are a plurality of the same single processes in the middle stages of the series of processing processes, these same processing processes are collected together at one position as a home position and other processes are arranged in loops which respectively pass through the home position. A guidance track is provided along the loops for a carrier to be moved on this guidance track so that articles to be produced are moved through the home position to a loop having a next processing process to carry the articles to a target processing process, or the articles processed in the processing process are recovered there and then moved to a further next processing process.

According to still another aspect of the present invention, a printed substrate carrier system is provided which follows the application of said article carrier system in such a way that printed substrates are sequentially carried to individual processing processes in a production process having a plurality of processing processes for a production of substrates. The printed substrate carrier system, in this case, has a washing process as a home position among the plurality of processing processes, forms loops for the rest of the processes which respectively pass through the home position, and includes a carrier car which runs on a guidance track provided along the loops and a means which has a file for managing the progress of accommodation containers for carrying the printed substrates, each container being given its own identifier, and for managing the progress of the processing processes so that the means reads out the identifiers to manage the progress of the corresponding processing processes. The printed substrate carrier system then has mounted on the carrier car the printed substrates that are accommodated in the accommodation container, moves the substrates to a loop having a next processing process through the home position, carriers the printed substrates to a target processing process, or recovers printed substrates that have been processed in the processing process for carrying them to a further next processing process, and reads out the identifiers of the accommodation containers to manage said progress.

The management system in accordance with the above-described feature of the present invention comprises a host managing means which manages control data necessary for the production of products, working device managing terminals which are provided in correspondence with the working devices that are used for the production and process information that is necessary in managing the corresponding working devices, and terminal information managing means which integrally manages information that is processed at the individual working device terminals, so that the management system distributedly owns in the individual means various information items that are necessary for the production or that are generated following the production, thereby avoiding the risk of load being concentrated on a part of the means. Accordingly, even if a part of the devices happens to be down, the information is distributed to the other devices so that the production can be provisionally continued by using the distributes information. Further, since the scale of the system itself can be made simple, it becomes possible to structure the system at low cost.

Further, when said individual working device terminals and said terminal information managing means are connected together through the network so as to enable transfer of information between the individual working device managing terminals and the terminal information managing means and between the individual working device managing terminals, information can be freely transferred between the working device managing terminals or between the terminal information managing means. Accordingly, it comes possible to make access to the terminal information managing means from any working device managing terminal so that information necessary for the working device terminal can be obtained.

Further, since data can be directly transferred between the working device managing terminals, the data can be transferred much easier than when it is transferred through the medium order systems as is necessary in the conventional system. Moreover, data can be transmitted without applying excessive load to the medium order systems.

Furthermore, the system is structured such that the working device managing terminals which require the control data to be transferred to them from the terminal information managing means and the host managing means that hold the control data are individually connected to the host managing means so as to transmit the information between them. Therefore, a large quantity of control data can be directly transferred from the host managing means to the working device managing terminals, causing no delay in data transfer. By this arrangement, the network is not occupied for a long time so that there exists less interruption of communication between other terminals. As a result, a low-cost and low-speed LAN can be used for the network.

In accordance with the above-described aspect of the present invention, one kind or two or more kinds of substrates that are used in lots of articles that are to be produced and parts or components which are to be mounted on the substrates are placed in a production process, with individual identifiers attached to the substrates, and also, identifiers are attached to containers in which parts or components are accommodated in sets corresponding to the substrates on which the parts are mounted, and thereafter, the identifiers are read out to enable the articles to be confirmed based on the information read out. As a result, this system can be preferably used in the production management system which manages the substrates and the parts in the production process.

In the above aspect, the NC data managing means holds and manages the NC control data which include production lot numbers, names of substrates that are used in the production lots, names of parts or components that are to be mounted on the substrates and positions (orders) of mounting the parts on the corresponding substrates. Further, the file generating means receives a transfer of product name data of the substrates that are to be used from the NC data managing means based on the lot numbers inputted from the outside and generates a correspondence table showing the relationship among the lot numbers, names of the substrates to be used and substrate identifier data which is the result of reading out the identifiers attached to the substrates. The file generating means also receives a transfer of product name data of the substrates that are to be used from the NC data managing means based on the lot numbers inputted from the outside and generates a correspondence table showing the relationship among the lot numbers, names of the substrates to be used and part identifier data which is the result of reading out the identifier attached to the containers which accommodate sets of products to be mounted on the substrates. Further, the file generating means generates a correspondence table showing relationship between shelf numbers of a warehouse and identification data of sets of parts and/or substrates when these are to be stored in the warehouse.

The file generalizing means generates an integrated correspondence table file by integrating the above-generates individual correspondence tables and transfers to the individual processing processes data which have been requested by these processes by retrieving the data from the integrated correspondence table. The means for performing management of these files can be constituted by using the above-described host managing means, working device terminals and terminal information managing means. By this arrangement, it is possible to organize the production management system which can perform an effective file management.

BRIEF DESCRIPTION OF THE DRAWINGS

FIG. 5 is a file format diagram of the substrate bar code application machine terminal, FIG. 6 is a file format diagram of the part layout machine terminal, FIG. 7 is a file format diagram which is common to both the parts preprocessing machine terminal and the part product name check machine terminal, FIG. 8 is a file format diagram of the part warehouse terminal, FIG. 9 is a file format diagram of the terminal information management system, FIG. 10 is a file format diagram of the solder paste printing machine terminal, FIG. 11 is a file format diagram which is common to the part loading machine terminal and the substrate loading parts product name inspection machine terminal, FIG. 12 is a file format diagram of the soldering machine terminal.

DESCRIPTION OF THE PREFERRED EMBODIMENTS

Figure 1:
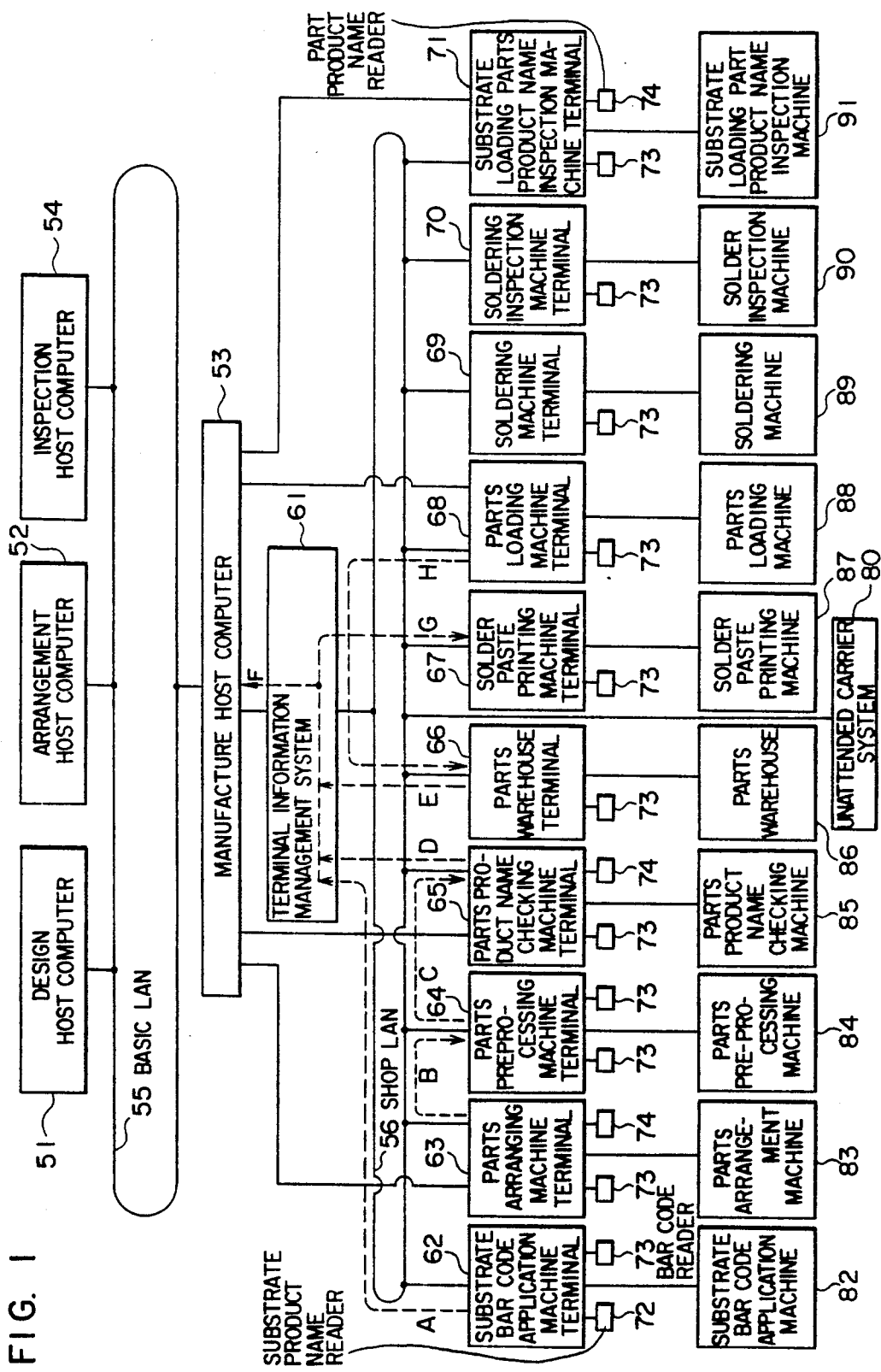
FIG. 1 is a system configuration diagram showing one embodiment of the present invention.

Description of the embodiments of the present invention will be made below with reference to the drawings. In the drawings, the same symbols show the similar parts and elements.

FIG. 1 shows an example of a hardware system which constitutes one embodiment of the case where the production management system of the present invention is applied to the printed substrate assembling process.

Referring to FIG. 1, the system of the present embodiment has a manufacture host computer 53, which is connected to a design host computer 51, an arrangement host computer 52 and an inspection host computer 54 through a basic LAN (Local Area Network) 55.

The manufacture host computer 53 holdingly manages actual loading information including a lot number, names of the substrates to be used, names of the parts to be loaded on the substrates which are used, loading positions and sequences, corresponding to each production lot, and transfers necessary information in accordance with the request from the low order devices. The manufacture host computer 53 also has a function to receive production management information from the low order devices and stores and manages the information as management information. The manufacture host computer 53 also receives load information (including load inspection information) together with design data, ordering data of necessary parts and inspection data from the design host computer 51, arrangement host computer 52 and inspection host computer 54 through the basic LAN 55, and generates control data in production lot unit based on these data.

The manufacture host computer 53 is connected with a terminal information management system 61 for managing information of each terminal by using a bar code to be described later as a key. The terminal information management system 61 is connected to a shop LAN 56 together with each of working device management terminals 62 to 71 for processing information necessary for the management of working devices to be described later. The terminal information management system 61 has a function of relaying transmission of data between the working device management terminals 62 to 71 and the manufacture host computer 53, a relational data base function for integrally managing management information which is necessary at each working device terminal, and a function of transmitting data to the working device terminals and the manufacturing host computer when necessary. Of course, the terminal information management system 61 can input and output management information by itself.

The working device management terminals 62 to 71 are more specifically provided as a substrate bar code application machine terminal 62, a part arranging machine terminal 63, a part preprocessing machine terminal 64, a parts product name checking machine terminal 65, a part warehouse terminal 66, a solder paste printing machine terminal 67, a part loading machine terminal 68, a soldering machine terminal 69, a soldering inspection machine terminal 70, and a substrate loading part product name inspection machine terminal 71. Each of the working devices to which these terminals are connected, in principle, constitutes an automatic device which carries out each work by NC control. In the following explanation, each of the working device management terminals 62 to 71 will not be called in individual names of the working devices and will be simply called as a terminal for simplification when each terminal is collectively and generally shown.

The shop LAN 56 is also connected with an unattended carrier system 80.

Of the terminals 62 to 71, the part arrangement machine terminal 63, the part name checking machine terminal 65, the parts loading machine terminal 68 and the substrate loading part product name inspection machine terminal 71 are also directly connected to the manufacture host computer 53. In other words, these terminals require information of the substrate product names, part product names, loading positions, etc. Since these information include a large data volume, they are structured to be capable of being directly transferred to the manufacturing host computer without passing through the shop LAN 56 of which capacity is small and transfer speed is low.

Figure 13:
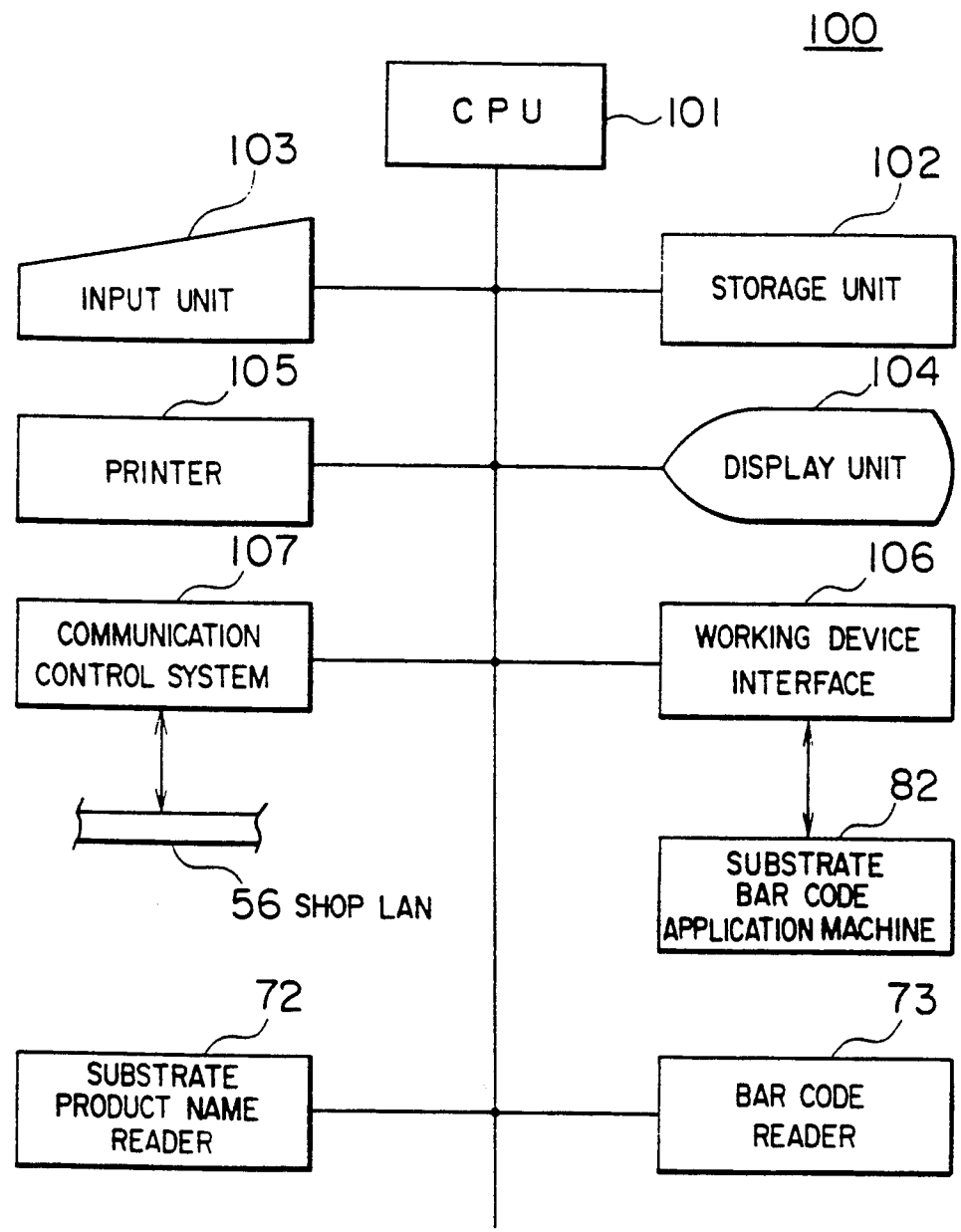
FIG. 13 is a block diagram showing one example of the information processing system which is used in the structure of the terminal and the like in the embodiment of the present invention.

The terminals 62 to 71 are constituted, for example, by the information processing system shown in FIG. 13. The information processing system shown in FIG. 13 is an example which constitutes the substrate bar code application machine terminal, and other terminals can also be constituted similarly.

This information processing system includes a central processing unit (CPU) 101 which executes control of the terminal system and various processings, a storage unit 102 which stores a program and data for realizing various functions by making the CPU 101 execute various processings, an input unit 103 such as a keyboard and the like from which instruction are given to the information processing system 100 from the outside or data is inputted, a display unit 104 which has a display device such as a cathode ray tube (CRT) and the like for displaying contents of input, results of processings, guide messages, etc., a printer 105 which produces printed outputs of input data, output data, graphs, etc., a working device interface 106 which transmits loading information from other terminals or the manufacture host computer 53 to the working device to be connected (such as the substrate bar code application machine 82) and receives status information (information of busy, end, fault, etc.) from the working device side, and a communication control unit 106 which transmits data to other terminals through the shop LAN 56.

As the input unit 103, a character reading unit may also be added for optically or magnetically reading characters and symbols in slips and command documents. A mouse and the like can also be added. A device for reading identifiers such as bar codes printed on slips may, of course, be added. Further, an audio input unit may be connected which can input instructions, lot names, substrate names, part names, etc. in voice.

The storage unit 102 is a main storage within the information processing system 100, and programs and data to be stored in this storage unit are supplied by auxiliary storage units such as magnetic discs and optical discs which are not shown, or by data transfer.

A management file is provided in the storage unit 102 corresponding to the working device to which the storage unit 102 is connected.

The display unit 104 to be used should desirably be able to make color display. The display unit 104 displays management information held by the terminal based on the instruction from the input unit 103. It is also possible to make the display unit 104 display production management information of the production management system by making access to the terminal information management system 61.

The information processing system 100 is also connected with a substrate product name reader 72 for reading a product name attached to a substrate and a bar code reader 73.

The bar code reader 73 has functions of a reading section for optically reading a bar code, a detecting section for detecting code information from a read signal, and an interface for inputting detected code information to the information processing system 100 (none of these functions are shown).

The information processing system constituting other terminals is connected with a part product reader 74 or the bar code reader 73 in place of the substrate product reader 72. The working device interface 106 is connected with other working devices in place of the substrate bar code application machine 82.

The terminal information management system 61 may be constituted by the information processing system as shown in FIG. 13, in the same manner as the terminals 62 to 71. In this case, the working device interface 106 and the bar code reader 73 need not be connected.

In this system, the terminal information management system 61 functions as an intermediate device positioned between the manufacture host computer 53 and the terminals 62 to 71. In other words, the terminal information management system 61 may be considered as a terminal for managing information of the other terminals 62 to 71.

The working devices to be connected to the terminals will be briefly explained below.

The substrate bar code application machine 82 has such a structure that, for example, bar code labels having numerals arranged in the ascending order are separately printed in advance and are prepared in a set, and the labels are removed from the base sheet and adhered to the substrates in the order that the substrates are applied to the substrate bar code application machine 82.

A part arrangement machine 83 is a device which arranges part groups applied to the printed substrate assembly system in one or a plurality of parts accommodation containers prepared in advance, in correspondence with the printed substrates to be loaded, thereby to arrange one or a plurality of parts sets corresponding to the substrates. The parts arrangement machine 83 is constituted, for example, by a means for arranging part accommodation containers and a parts arrangement means for arranging parts at predetermined positions in a predetermined sequence in accordance with arrangement instructions from the parts arrangement machine terminal 63.

A part preprocessing machine 84 is a device which matches legs and the like of parts in the form which can be easily loaded on the printed substrate.

A parts name checking machine 85 has functions of a reading section for optically reading product names and symbols which are printed on parts, a detecting section for extracting parts names from read signals and an interface for inputting detected parts name information to a parts product name check machine terminal 65 (none of these functions is shown).

A parts warehouse 86 has shelves and a means for accommodating and taking out parts to and from the shelves, thereby to keep parts in parts set units corresponding to the substrates and take out the parts sets when a take-out command is received from the parts warehouse terminal 86 after the substrates corresponding to the parts have been prepared. The product sets are kept by part accommodation containers for accommodating these product sets.

A solder paste printing machine 87 is constituted, for example, by metal mask keeping section for keeping metal masks of mask patterns corresponding to the substrates, mask set sections for arranging a metal mask on a substrate in accordance with a selection instruction, and a printing section for printing a solder paste on a substrate through a set metal mask (none of these is shown). The solder paste printing machine 87 is a device which prints solder at a connection position of a substrate where a part is to be connected, through a mask pattern such as a metal mask corresponding to the connection position. A mask pattern is decided for each substrate to be printed, and a mask pattern which matches a substrate is selected by a common from the solder paste printing machine terminal 67.

A parts loading machine 88 is a device for loading parts to be loaded on a printed substrate. This devide is constituted, for example, by a parts holding section for taking up a part from the parts accommodation container and a moving mechanism for moving the part to a predetermined position on the substrate. A moving position is instructed by the parts loading machine terminal 68.

A soldering machine 89 is a device for inputting a substrate loaded with a part and soldering the part at a predetermined position of the substrate.

A solder inspection machine 90 includes an image pickup means such as a camera and a means for fudging whether a soldering is normal or not based on a shape of the solder shown by an optical image data obtained.

A substrate loading part product name inspection machine 91 is constituted in the manner similar to the parts name checking machine 85, which reads a product name of a part loaded and sends it to the substrate loading part product name inspection machine terminal 71.

Operation of the present embodiment will be explained with reference to other drawings. FIG. 16 shows flow of information in the present embodiment.

Figure 2:
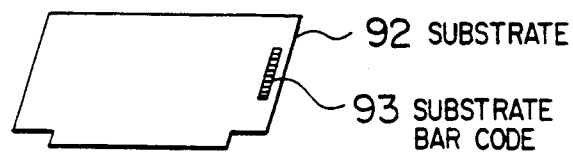
FIG. 2 is a perspective view of the substrate.

FIG. 2 illustrates a configuration of a substrate 92 applied to the manufacturing line shown in FIG. 1.

The substrate 92 applied is attached with a substrate bar code 93 which is unique to each substrate by a substrate bar code application machine 82.

When an operator manually applies a work lot number from an input unit 103 of the substrate bar code application machine terminal 62, the substrate bar code adhesion machine terminal 62 requests transfer of a substrate product name to the manufacture host computer 53 through the terminal information management system 61. At this request, the manufacture host computer 53 transmits information of a substrate product name which is manufactured in this work lot number. The substrate bar code application machine terminal 62 reads by the bar code reader 73 a number of the substrate bar code which has been adhered to the substrate product name that was read by the substrate product name reader 72, and holds in a list table these information in the form of a file as shown in FIG. 5.

The file information is sent to the terminal information management system 61 each time when the work lot number changes, and the information is collected in one file and managed there. A broken line indicated as "A" in FIG. 1 shows a transfer path of this file.

Substrates attached with bar codes are then supplied to a part loading machine.

On the other hand, parts to be loaded on substrate are supplied to the parts arranging machine 83 in a random order for each work lot number, and the parts are then arranged in the order of loading to the substrates for each substrate by the parts arranging machine 83. FIG.

3 shows a state of producing an output by the parts arranging machine 83.

Figure 3:
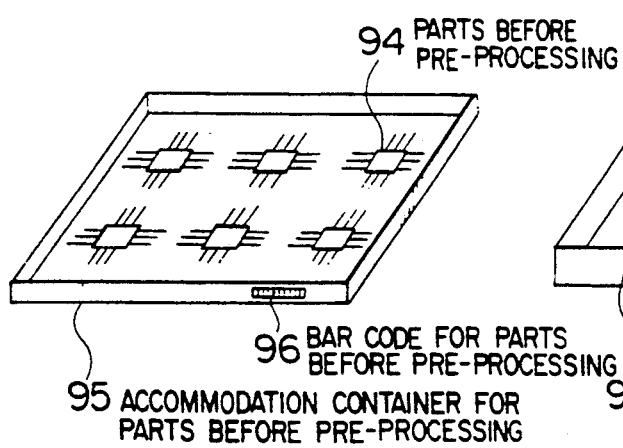
FIG. 3 is a perspective view of the preprocessing prepart accommodation container.

In FIG. 3, parts before preprocessing 94 that are arranged are accommodated on an accommodation container 95 for parts before preprocessing. A bar code 96 for parts before preprocessing is adhered in advance to the accommodation container 95 for parts before preprocessing. The bar code 96 for parts before preprocessing are fixedly adhered to the accommodation container 95 for parts before preprocessing, and the accommodation container 95 for parts before preprocessing is repeatedly used to accommodate other parts. In the present embodiment, the accommodation container 95 for parts before preprocessing is repeatedly used, but this may also be abandoned.

When the operator manually inputs a work lot number, the parts arrangement machine terminal 63 transmits a request for a transmission of an NC data to the manufacture host computer 53 through the terminal information management system 61.

At this request, the manufacture host computer 53 directly transmits to the parts arrangement machine terminal 63 data including product names of substrates which work in the work lot number, product names of parts to be loaded to each substrate and order of loading the parts, without passing through the terminal information management system at this time. The reason why the data is transmitted directly is to dispose the load applied to the terminal information management system by avoiding passing of a large quantity data such as NC data to the terminal information management system 61.

The part arrangement machine terminal 63 prepares a table based on the NC data and manages the parts in such a way that decision is made as to at which position of which accommodation container 95 for parts before preprocessing the part read from the parts product name reader 74 is to be positioned by deleting tables. In arranging parts, the parts arrangement machine terminal 63 prepares a list table of the bar codes of the products before preprocessing read by the bar code reader 73 and the substrate product names in a file of the form as shown in FIG. 6, in order to allocate the accommodation containers 95 for parts before preprocessing to the substrate product names. The information in this file is sent to the next parts preprocessing machine terminal 64 by each work separation of the parts arrangement machine 83.

A broken line indicated by "B" in FIG. 1 shows a transfer path of this file.

Figure 4:
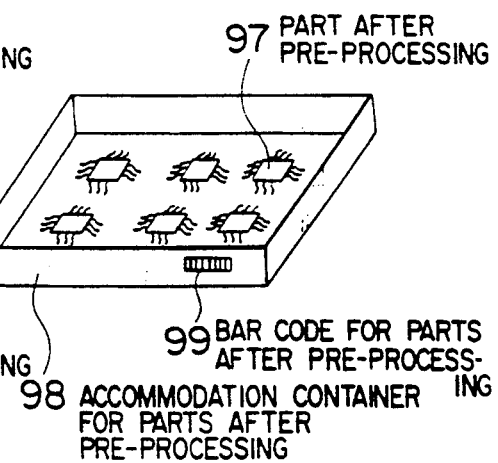
FIG. 4 is a perspective view of the preprocessing postpart accommodation container.

The parts 94 before preprocessing accommodated in the accommodation container 95 for parts before preprocessing that have been sent from the parts arrangement machine 83 are supplied to the part preprocessing machine 84, where preprocessing of the parts is carried out, for example, legs of the parts are formed (e.g. formation of IC pin layout) as shown by parts 97 after preprocessing in FIG. 4 and the parts accommodation container is also replaced by an accommodation container 98 for parts after preprocessing to match the shapes of the parts.

The accommodation container 98 for parts after preprocessing is adhered with a bar code 99 for parts after preprocessing which is own to each accommodation container 98 for parts after preprocessing, in the same manner as the bar code 96 for parts before preprocessing.

The part preprocessing machine terminal 64 makes the bar code 96 for pats before preprocessing in the accommodation container 95 for parts before preprocessing read by the bar code reader 73 correspond to the bar code 99 for parts after preprocessing in the accommodation container 98 for parts after preprocessing read by another bar code reader 73 to prepare a file as shown in FIG. 7. This file is sent to the next part product name check machine terminal 65. A broken line indicated by "C" in FIG. 1 shows a transfer path for this file.

The accommodation container 98 for parts after preprocessing accommodating the parts 97 after preprocessing which have been sent from the parts preprocessing machine 84 is supplied to the part product name check machine 85 to check whether the parts to be loaded to the substrate have been accommodated in a correct order without error. In other words, the part product name check machine terminal 65 reads the bar code 99 for parts after preprocessing by the bar code reader 73, retrieves information shown in FIG. 7 which has been received from the part preprocessing machine terminal 64 to seek a corresponding substrate product name, makes the manufacture host computer 53 send NC data for checking product names for relevant substrates for each work lot number, and checks whether the product names read by the part product name reader 74 and the orders thereof are correct or not.

The part product name check machine terminal 65 transfers the information shown in FIG. 7 which has been received from the part preprocessing machine terminal 64 to the terminal information management system 61 through a path indicated by a broken line "D" in FIG. 1.

The accommodation container 98 for parts after preprocessing which has passed through the part product name check machine 85 is supplied to the part warehouse 86. The part warehouse terminal 66 reads the bar codes 99 for parts after preprocessing by the bar code reader 73, allocates the bar codes 99 for parts after preprocessing to empty shelves of the part warehouse 86 as shown in FIG. 8, prepares a file including these information and stores the accommodation container 98 for parts after preprocessing in a relevant shelf of the parts warehouse 86.

The information shown in FIG. 8 is sent to the terminal information management system 61 as shown by a path indicated by a broken line "E" in FIG. 1. Then, at the terminal information management system 61, information as shown in FIG. 9 is obtained from the information in FIGS. 5, 7 and 8, that is, through the broken line paths "A", "D" and "E" in FIG. 1. This information is sent to the manufacture host computer 53, as shown by a broken line "F" in FIG. 1, and is used there for historical management and the like.

The terminal information management system 61 always monitors the file in FIG. 9, and when both columns of the file, i.e. the substrate bar code column and the part warehouse shelf number column, are filled, further, if possible when all the substrate columns of the same work lot number are filled, in other words, when both substrates and parts are ready, sends a command to the solder paste printing machine terminal 67 to coat a solder paste to the substrates. This command is noticed to the operator of the sold paste printing machine, for example, by displaying the work lot numbers or the substrate product names in the display unit or the like. A broken line indicated by "G" in FIG. 1 shows a flow of this information, and the information which is sent is shown in FIG. 10.

When the operator supplies a substrate commanded to the solder paste printing machine 87, the solder paste printing machine terminal 67 reads the substrate bar code 93 by using the bar code reader 73, knows corresponding substrate product name in the file of FIG. 10, and makes a corresponding printing mask be taken out to make the solder paste printing machine 87 print solder paste. The substrate after the printing is supplied to the parts loading machine 88.

Next, the parts loading machine terminal 68 reads a substrate bar code 93 of the substrate supplied to the parts loading machine 88 by the bar code reader 73 and sends the substrate bar code information to the terminal information management system 61 to make this system do the following two jobs.

One job to be done by the terminal information management system 61 is to retrieve a file of FIG. 9 and transfer the information of work lot numbers and substrate product names corresponding to the substrate bar codes 93 which have been read, as shown in FIG. 11, to the part loading machine terminal 68. The parts loading machine terminal 68 sends an NC data transfer request to the manufacture host computer 53 based on the work lot numbers to have the NC data transferred. Based on the NC data transferred, the parts loading machine 88 loads predetermined parts 97 after preprocessing to predetermined positions on the substrates.

Another job to be done by the terminal information management system 61 is to send to the part warehouse terminal 66 the part warehouse shelf numbers corresponding to the substrate bar codes 93 which have been read when the file of FIG. 9 was retrieved, so that the accommodation container 98 for parts after preprocessing is taken out of the part warehouse 86. This take-out request is shown by a broken line "H" indicated in FIG. 1.

The accommodation container 98 for part after preprocessing that has been taken out is automatically supplied to the part loading machine 88, where the parts 97 after preprocessing are taken out one by one in order and loaded on a substrate. The emptied accommodation container 98 for parts after preprocessing is returned to the part preprocessing machine 84, where the accommodation container is used again to accommodate parts 97 after preprocessing for another substrate.

As explained above, bar codes for parts before processing, bar codes for parts after preprocessing and part warehouse shelf numbers are repeatedly used to accommodate parts of other substrates, so that at a point of time when these bar codes and numbers become unnecessary they can be deleted from the file at respective terminals or identification codes are written in the file to the effect that they are invalid.

Next, substrates loaded with parts taken out from the parts loading machine 88 are supplied to the soldering machine 89. Description will be continued of the case where Nc data is not necessary for soldering.

The soldering machine terminal 69 is used for the purpose of production management. In otherwords, when the substrate bar code 93 is read by the bar code reader 73, the soldering machine terminal 69 prepares a file as shown in FIG. 12 and transmits the information of this file to the manufacture host computer 53 through the terminal information management system 61, so that the information is used for production management to make it possible to understand what was manufactured by whom and when under what conditions, etc.

Substrate bar code information is sent to the manufacture host computer 53 through the path indicated by the broken line "F" in FIG. 1. Therefore, the soldering machine terminal 69 may also be directly connected to the manufacture host computer 53 without passing through the shop LAN 56.

Next, a substrate after soldering which has been taken out from the soldering machine 89 is supplied to a solder inspection machine 90. Description will be continued on the assumption that NC data is not necessary for the solder inspection machine 90. The solder inspection machine 90 checks whether soldering has been done normally or not by inspecting the shapes of soldering with a camera or the like. A solder inspection machine terminal 70 is used for production management, as is the case with the soldering machine terminal 69. In other words, the solder inspection machine terminal 70, for example, writes results of inspection in a file shown in FIG. 12, though the operation is not shown here.

All the terminal can also be used for production management though this has not been mentioned so far.

A substrate having passed through the solder inspection machine is then supplied to a substrate loading parts product name inspection machine.

By the part-loaded substrate inspection machine, it is checked whether correct parts have been loaded at correct positions of a substrate. After the substrate bar code 93 is read by the bar code reader 73, the substrate loading part product name inspection machine terminal 71 receives the information shown in FIG. 11 from the terminal information management system 61, requests the manufacture host computer 53 to supply NC data showing the product names of the parts loaded and the loading positions of the parts loaded, and receives this information from the manufacture host computer 53. Then, the part-loaded substrate inspection machine reads the product names of the parts sealed on the parts on the substrate by the part product name reader connected to the part product name inspection machine terminal for the part-loaded substrate, and checks whether the result matches the NC data.

As described above, according to the present embodiment, systems are hierarchically organized to avoid concentration of load on one computer to enable distributed processings at individual terminals, so that a system of efficient investment having no waste as a whole can be organized. Further, since one information item is held redundantly by the computers as well as the terminals, it is possible to carry out a temporary operation even if a part of the device is in failure, to thereby practically improve reliability of the system.

Next, an embodiment of an unattended carrier system which an manage production progress will be explained.

The unattended carrier system of the present embodiment has fabrication processes of various kinds of printed substrates registered in advance as a master in a carrier system terminal which has management and control functions, sets a process called a home position in the fabrication process, sets flags of the processes registered as a master after each process is over/and checks and updates the production progress. The production process which becomes a master is a very flexible system having functions of change, updating, prioritization, etc.

Description will be made of a case where this system is built in the postprocess of a printed substrate fabrication.

In this case, attention is paid to the fact that a printed substrate is washed each time when the substrate passes a process including a soldering process and others, and therefore, in the postprocess processing of a fabrication of a printed substrate, the washing process is decided as a home position and other processes are built in a plurality of loops.

Figure 14:
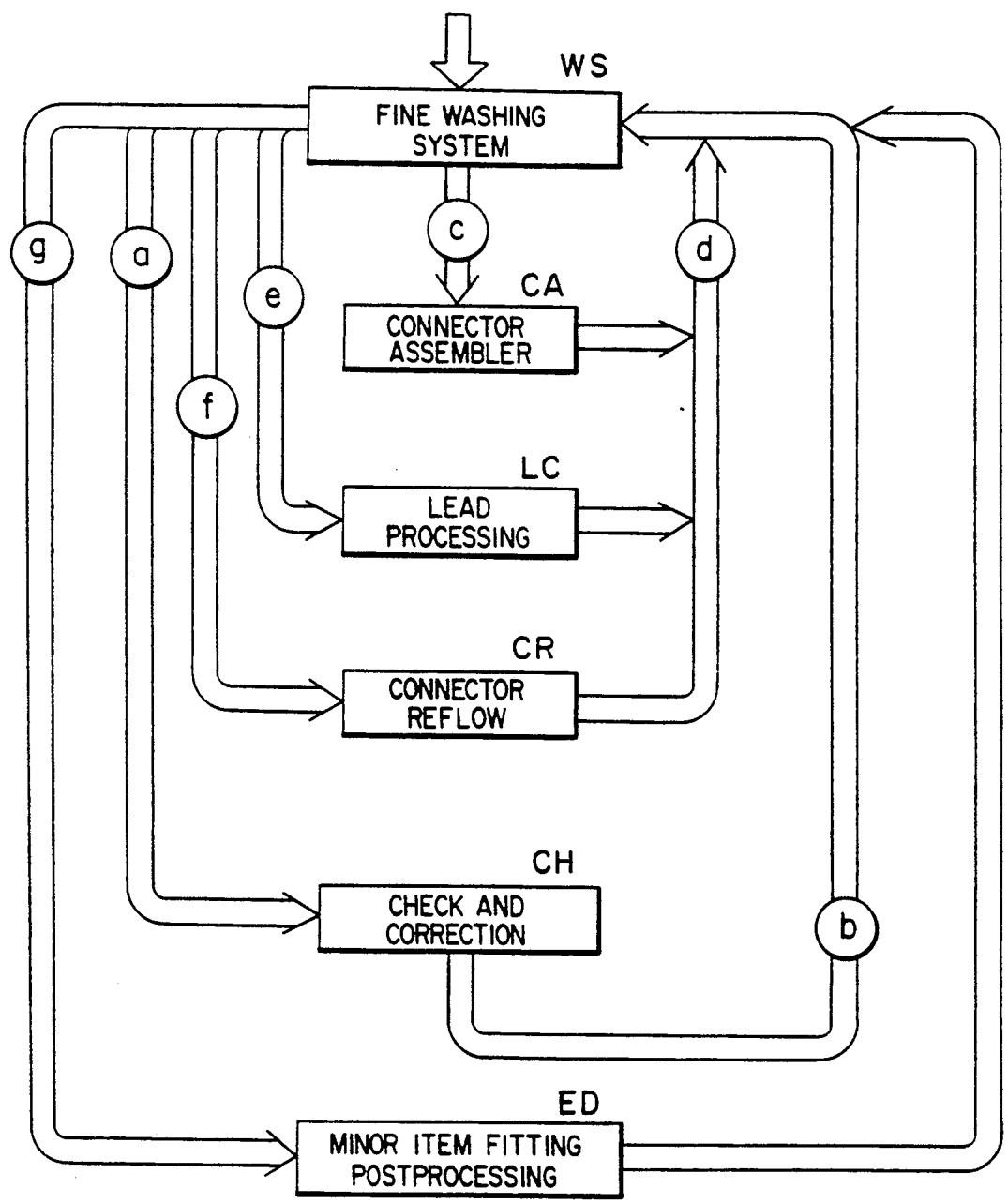
FIG. 14 is an explanatory diagram sowing one example of the unattended carrier system which is another embodiment of the present invention.

To be more specific, this system has a structure as shown in FIG. 14, as an example, where the system has a fine washing system WS, a connector assembler CA for fitting connectors to a substrate, a lead processor LC for processing a lead wire for the connector and the like, a connector reflow CR for soldering a lead wire for the connector, check and correction CH and a minor item fitting postprocessing ED for fitting minor items such as metal tools for loading a substrate on the mother board and the like, where the fine washing system WS is made as a home position which is connected with the other processes that are formed in a plurality of loops to thereby carry a substrate.

Substrates are carried in a constant unit, for example, in a lot unit, and in the state that these lots are accommodated in one or a plurality of accommodation containers. Each accommodation container has a structure having a plurality of racks, each rack containing a substrate, for example, and preferably, the racks are structured to be portable. Each accommodation container has a bar code which is an identifier of the container itself.

Figure 15:
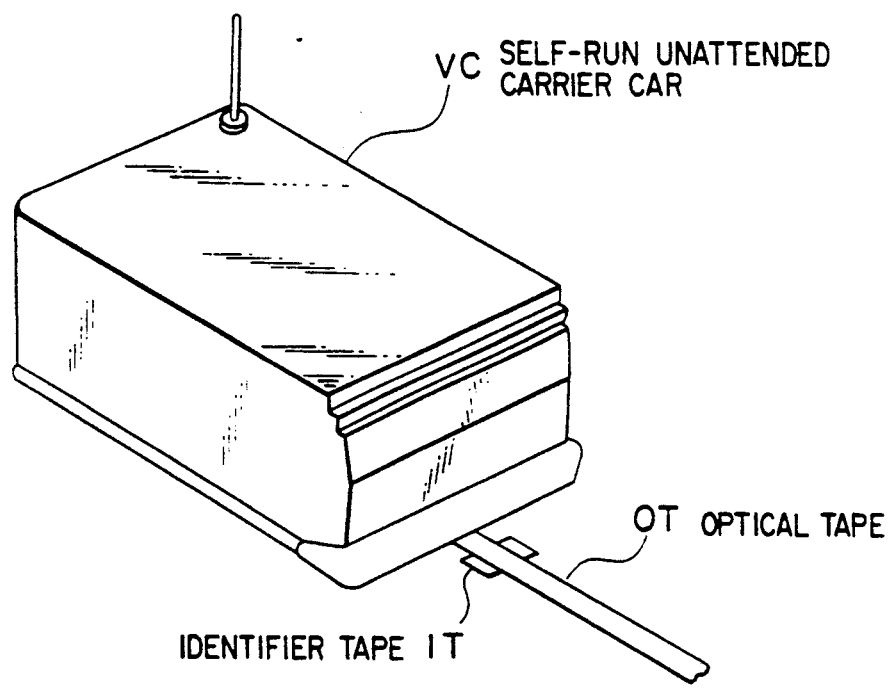
FIG. 15 is a perspective view showing one example of the carrier car which is used in the unattended carrier system, and FIG. 16, 16A and 16B constitute an explanatory diagram showing the flow of information in the production management system of the present invention.

The accommodation containers are carried between the processes by being loaded on a carrier car, in principle. The carrier car is a self-run unattended carrier car VC which moves along a guidance optical tape OT provided in advance on the run route, as shown in FIG. 15, for example. Identifier tapes IT which indicate positions are suitably provided on the optical tape OT.

An instruction to the carrier car VC can be given through a communication means.

The system of the present embodiment includes terminals for managing the postprocess. The terminals have files which show processes to be done and the progress of the processes in lot unit. The terminals have bar code readers and can make access to the files by using a read bar code as a key. By this arrangement, each time when substrates pass the home position in the state that the substrates are accommodated in an accommodation container, the bar code of the container is read and the processes that have been finished are registered in the file to make it possible to understand the progress of the processes.

The move of the substrates described above with reference to FIG. 14 is carried out, for example, in the following manner.

At first, printed substrates on which parts have been soldered are supplied to the fine washing system WS. In this case, if the substrates have already been washed in the previous process, these substrates are not washed at this stage and they are moved to the next process, that is, the check and correction CH (route a). After this process, the substrates are returned to the fine washing system WS (route b) and are moved to the next connector assembly CA (route c). Thereafter, the substrates are returned to the home position again through the route d.

The rest of the processes, that is, the lead processing LC, connector reflow CR and check and correction CH, are all processed in loops which respectively pass through the fine washing system WS (through routes e, f, a, d and b) in the manner similar to that described above. Then, the substrates are moved to the last process of the minor item fitting postprocessing ED (route g), where the accommodation container is taken out of this system.

The above-described move of the substrates is carried out by a carrier car. It is possible to reduce the influence of process processing time if it is so designed that a carrier car, after moving certain substrates to a certain process, does not wait there for the process to be finished and collects other substrates that have already been processed at that process and then returns to the home position.

It is needless to mention that the above-described embodiments are only a part of examples and other configurations can also be employed. For example, a working device which is different from the one explained may be added or the working device may be changed. Further, each working device may not require one corresponding terminal, but a plurality of working devices may require one terminal.

With regard to the above-described embodiments, it is also possible to have such an arrangement, for example, that a substrate warehouse is added, or oppositely, the preprocessing function is omitted, or a part of the inspection machines is omitted. In accordance with these changes, the contents of the files prepared at the terminals may be changed.

What is claimed is:

1. A production management system for managing production of a device having an associated lot number, the managing production being carried out by using working devices arranged in processes, said production management system comprising:

host managing computer managing control data necessary for the production of a product, said control data being based on said lot number;

a plurality of working device managing terminal means, each provided in correspondence with at least one of the working devices, for processing information necessary for managing the corresponding working devices, at least one of said working device managing terminal means including means for capturing product identification code information;

terminal information managing means for integrally managing information processed by each of said working device managing terminal means;

a first data communication network permitting data communication between each of said working device managing terminal means and said terminal information managing means, and among said individual working device managing terminals; and a second data communication network permitting direct data communication between ones of said working device managing terminal means which require transfer of control data and said host managing computer.

2. A production management system for managing fabrication of printed substrates having an associated lot number, the fabrication management being carried out by using a plurality of working devices arranged in processes, said system comprising:

host management computer for managing load information necessary for loading parts on printed substrates, said load information being based on said lot number;

working device managing terminals, each provided in correspondence with at least one of the plurality of working devices used for the fabrication of printed substrates and which process information necessary for managing the corresponding at least one of the plurality of working devices, at least one of said working device managing terminals including means for capturing product identification code information; and terminal information management means for integrally managing information processed at each of said working device managing terminals, wherein each of said working device managing terminals is connected with the terminal information management means through a network so as to enable transfer of information between the individual working device managing terminals, and the terminal information management means and between the individual working device managing terminals, and wherein ones of said working device managing terminals, which require transfer of loading information held by said terminal information management means and said host management computer, being directly and sequentially connected with said host management computer so as to transfer information therebetween.

3. A production management system wherein at least one kind of substrates used in a lot of articles to be produced and parts to be mounted on said substrates are supplied to production processes, with individual identifiers attached to said substrates, and also identifiers attached to container in which parts are accommodated in sets corresponding to the substrates on which the parts are mounted, thereafter said identifiers being read out to enable the articles to be confirmed on the basis of the information read out, to thereby manage the substrates and the parts in the production processes, said production management system comprising:

numerical control (NC) data managing means for holding and managing NC control data including production lot numbers, names of substrates to be used in the production lots, names of parts to be mounted on the substrates and positions and/or orders of the parts that are to be mounted on the corresponding substrates;

first file preparation means responsive to product data of substrates to be used from said NC data managing means based on the lot numbers to be inputted from the outside, for generating a correspondence table indicating a relationship among the lot numbers, names of the substrates to be used and substrate identifier data which is a result of reading the identifiers attached to the substrates;

second file preparation means responsive to product data of substrates to be used from said NC data managing means based on the lot numbers to be inputted from the outside, for generating a correspondence table indicating a relationship among the lot numbers, names of the substrates to be used and part identifier data that is a result of reading the identifiers attached to the containers in which sets of parts to be mounted on the substrates are accommodated;

third file preparation means for generating a correspondence table showing a relationship between shelf numbers in a storehouse and identification data of the sets of the parts and/or the substrates in the case of storing them in the storehouse; and file management means for integrating said generated correspondence tables to generate an integrated correspondence table file and retrieve data requested by a production process from said integrated correspondence table and transfer the data to the production process.

4. A production management system according to claim 1, wherein said working device managing terminal means and said terminal information managing means include input units for externally applying instructions and data, display units for displaying management information and a storage unit for storing data prepared by the own system or data transferred from the others.

5. In a production process having a plurality of processes, a method of carrying articles in an article carrier system for sequentially carrying articles in production to each process comprising steps of:

arranging a first process at one place as a home position where the first process is performed a plurality of times in the middle of a series of processes;

arranging other processes in loops which respectively pass through said home position; and providing a guidance route along each of the loops and moving a carrier car on the guidance root to move articles to be produced to a loop including a next process through the home position, so that the articles are carried to a target process and the articles that have been processed in the target process are recovered and then carried to a further next process.

6. An unattended carrier system for performing a series of individual processes, at least one of which is repeated, comprising:

a) means for carrying articles;

b) a plurality of means for performing individual processes, said plurality of means for performing individual processes including
a home position, wherein said home position represents one of said plurality of individual processes that is repeated, and
other positions, wherein said other positions represent all of said plurality of individual processes not including said home position;

c) a plurality of means for guiding said means for carrying articles, each of said plurality of means for guiding said means for carrying articles including a first path from said home position to one of said other positions and a second path from said one of said other positions to said home position.

7. A process for performing a series of processes, at least one of which is repeated in the middle stages of said series of processes, on an article carried by an article carrier comprising steps of:

a) determining which one of said series of processes is repeated in the middle stages of said series of processes;

b) designating said one of said series of processes determined in step (a) as home position processes;

c) collecting said home position processes at a single home position;

d) arranging all other of said series of processes in loops, each passing through said home position;

e) provide a means for guiding said article carrier along said loops;

f) depositing said article on said article carrier;

g) carrying said article to different means for processing based on said series of processes.

8. A system for sequentially processing a plurality of printed substrates comprising:
   a) a plurality of means for processing said printed substrates, said plurality of means for processing said printed substrates
      i) including means for performing a washing process, said means for performing a washing process being designated as a home position;
   b) means for carrying said printed substrates;
   c) means for guiding said means for carrying said printed substrates, said means for guiding forming a plurality of loops, each of which pass through said home position as well as an associated one of said plurality of means for processing said printed substrates;
   d) a plurality of means for accommodating said printed substrates, each of said plurality of means for accommodating said printed substrates including a means for identification;
   e) means for transferring said printed substrates from one of said means for accommodating said printed substrates to said means for carrying said printed substrates;
   f) means for controlling said means for carrying said printed substrates such that it passes through said home position to a target position via one of said plurality of loops; and
   g) means for managing progress of said system, said means for managing progress of said system including
      i) means for managing the progress of said plurality of means for accommodating said printed substrates, and
      ii) means for managing progress of each of the plurality of means for processing, said means for managing progress of each of the plurality of means for processing including a means for reading said means for identification, and
      said means for managing progress of said system further controlling
      i) said means for transferring said printed circuit cards, and
      ii) said means for controlling said means for carrying.

9. The production management system as claimed in claim 1 wherein said managing terminal means further includes:
   i) means for reading an identification code applied to a product to be worked by the relevant working device;
   ii) means for receiving information specifying a numerical control data and held by the host managing means;
   iii) means for composing a file which relates said identification code and said specifying information; and
   iv) means for transferring the file to said terminal information managing means,
   wherein said terminal information managing means further includes:
      i) means for relating the files transferred from a plurality of the working device managing terminal means to one another;
      ii) means for holding the related filed;
      iii) means for selecting information specifying numerical control data required by a certain working device managing terminal means based on a request of said certain working device managing terminal from the files held therein; and
      iv) means for transferring the selected information to said certain working device managing terminal means, and wherein said certain working device managing terminal means further includes means for requesting the host managing means to transfer numerical control data from said host managing means based on the information specifying the numerical control data from said certain terminal information managing means.

10. The production management system as claimed in claim 2 wherein said managing terminal means further includes:
    i) means for reading an identification code applied to a product to be worked by the relevant working device;
    ii) means for receiving information specifying a numerical control data and held by the host managing means;
    iii) means for composing a file which relates said identification code and said specifying information; and
    iv) means for transferring the file to said terminal information managing means,
    wherein said terminal information managing means further includes:
       i) means for relating the files transferred from a plurality of the working device managing terminal means to one another;
       ii) means for holding the related files;
       iii) means for selecting information specifying numerical control data required by a certain working device managing terminal means based on a request of said certain working device managing terminal from the files held therein; and
       iv) means for transferring the selected information to said certain working device managing terminal means, and
       wherein said certain working device managing terminal means further includes means for requesting the host managing means to transfer numerical control data from said host managing means based on the information specifying the numerical control data from said certain terminal information managing means.

11. The production management system as claimed in claim 1 wherein said at least one of said working device managing terminal means further includes a means for establishing a form, said form relating said captured product identification code information with said lot number.

12. The production management system as claimed in claim 2 wherein said at least one of said working device managing terminal means further includes a means for establishing a form, said form relating said captured product identification code information with said lot number.

* * * * *